United States Patent
Fukushima et al.

(10) Patent No.: US 7,130,478 B2
(45) Date of Patent: Oct. 31, 2006

(54) METHOD AND APPARATUS FOR IMAGE DATA CORRECTION

(75) Inventors: Yoshinobu Fukushima, Shiga-ken (JP); Hiroki Nakano, Ohtsu (JP); Masahiko Kitagawa, Kusatsu (JP)

(73) Assignee: International Business Machines Corporation, Armonk, NY (US)

( * ) Notice: Subject to any disclaimer, the term of this patent is extended or adjusted under 35 U.S.C. 154(b) by 1059 days.

(21) Appl. No.: 10/085,328

(22) Filed: Feb. 28, 2002

(65) Prior Publication Data

US 2002/0186306 A1   Dec. 12, 2002

(30) Foreign Application Priority Data

Mar. 8, 2001   (JP) .............................. 2001-064713

(51) Int. Cl.
*G06K 9/40*   (2006.01)
*H04N 5/228*   (2006.01)

(52) U.S. Cl. .................................... 382/260; 348/222.1

(58) Field of Classification Search ................ 382/260, 382/254, 275, 312, 266, 305; 348/222.1; 702/17; 327/317

See application file for complete search history.

(56) References Cited

U.S. PATENT DOCUMENTS

| 6,173,029 B1 * | 1/2001 | Xie et al. ...................... 378/4 |
| 6,278,950 B1 * | 8/2001 | Kim et al. ..................... 702/17 |
| 6,304,997 B1 * | 10/2001 | Huber ............................ 716/1 |
| 6,446,244 B1 * | 9/2002 | Huber ............................ 716/8 |

FOREIGN PATENT DOCUMENTS

| JP | 06-303426 | 7/1992 |
| JP | 04-192910 | 10/1994 |
| JP | 10-320379 | 12/1998 |

* cited by examiner

*Primary Examiner*—Kanjibhai Patel
(74) *Attorney, Agent, or Firm*—Mark E. McBurney

(57) ABSTRACT

An apparatus and a method for correcting image data detected by an image sensor with less used memory space and fewer arithmetic operation executions is provided for. A data correcting apparatus of the present invention comprises an operation memory for storing expansion coefficient array data and basis function array data, which includes data of expansion coefficients and function values of a basis function for orthogonally expanding a high order polynomial for correcting input image data; and an operation part for correcting the input image data using the expansion coefficient array data and the basis function array data. With the use of the apparatus, the processing time of the operation part can also be minimized.

18 Claims, 5 Drawing Sheets

METHOD AND APPARATUS FOR IMAGE DATA CORRECTION

BACKGROUND OF THE INVENTION

1. Field of the Invention

The present invention relates to an apparatus and a method for correcting image data detected by an image sensor such as a charge coupled device (CCD) and more particularly to an apparatus and a method for correcting image data detected by an image sensor with less used memory space and fewer arithmetic operation executions.

2. Description of the Related Art

Charge coupled devices are currently known in the art and used of image sensing in digital cameras, and the like. Correcting such image data is often causes problems in conventional systems. More particularly, these problems are often due to the large amount of memory required for storage of the image data and the variables utilized in the arithmetic operations needed to implement the correction of image data sensed by charge coupled devices.

Therefore, it can be seen that a need exists for an apparatus and method that can manipulate the image data sensed by a charge coupled device to correct any errors to such image data more efficiently by reducing the use of computing resources such as memory and increasing throughput of any needed data manipulation operations.

SUMMARY OF THE INVENTION

In contrast to the prior art, an apparatus and a method for correcting image data detected by an image sensor is provided which uses less memory space and fewer arithmetic operation executions. A data correction apparatus of the present invention comprises an operation memory for storing expansion coefficient array data and basis function array data, which includes data of expansion coefficients and function values of a basis function for orthogonally expanding a high order polynomial for correcting input image data; and an operation part for correcting the input image data using the expansion coefficient array data and the basis function array data. With the use of the apparatus of the present invention, the processing time of the operation part can also be minimized.

DETAILED DESCRIPTION

Next, a preferred embodiment of an apparatus and a method for image data correction of the present invention will be described in detail based on the previously presented drawings.

Figure 1:
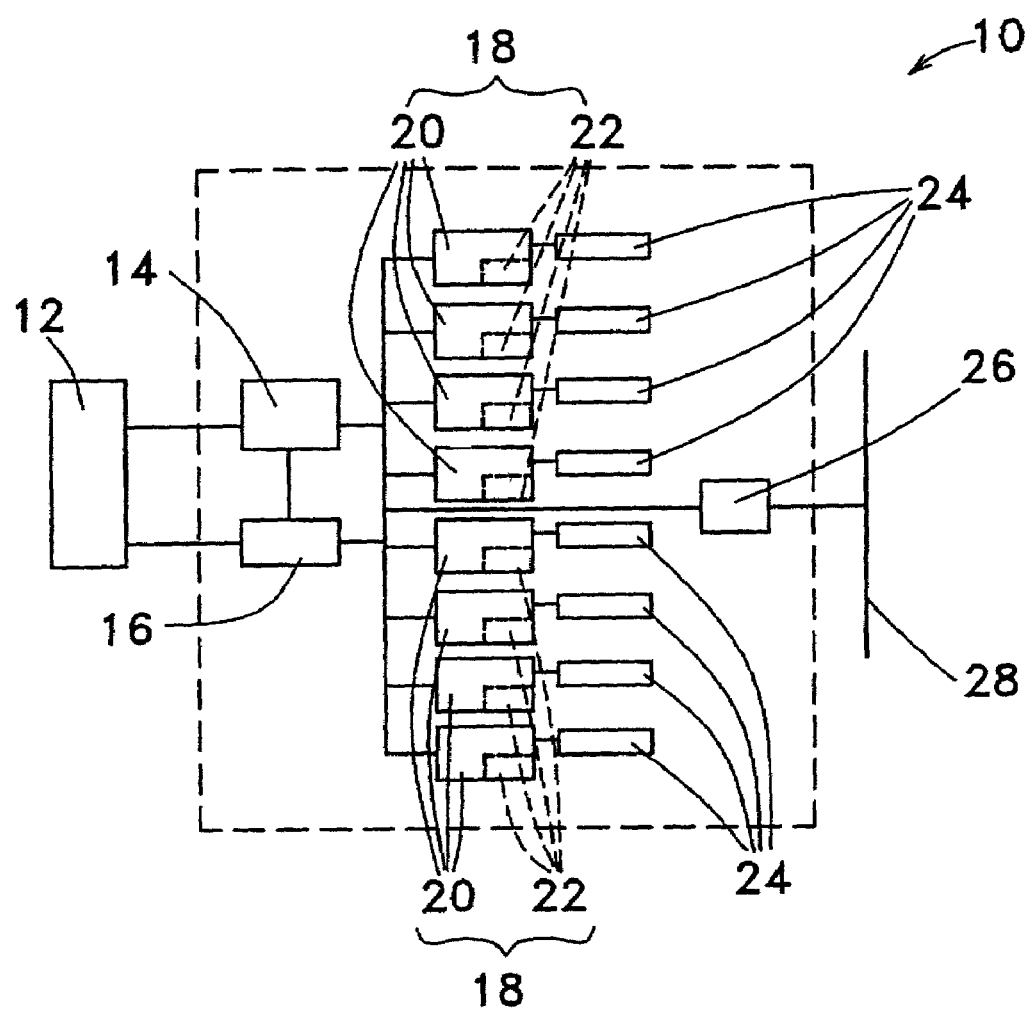
FIG. 1 is a schematic of an apparatus for image data correction of the present invention.

As shown in FIG. 1, an apparatus 10 for image data correction of the present invention comprises operation memories 22 each of which stores expansion coefficient array data and basis function array data. The expansion coefficient and basis function array data respectively include data of expansion coefficients and basis function values of a basis function for orthogonally expanding a high order polynomial used for correction of the input image data. The apparatus 10 further comprises arithmetic operation parts or units 20 each of which performs arithmetic operations to correct the image data based on the expansion coefficients and basis function values stored in its associated operation memory 22. A plurality of sets of the operation part 20 and operation memory 22 are provided. The apparatus 10 further includes a controller 14, a buffer memory 16, a data memory 24 associated with each operation part 20, and a Peripheral Component Interconnect (PCI) interface 26. The buffer memory 16 temporarily stores input image data detected by an input image sensor 12 which may be a CCD line sensor composed of CCD sensing elements arranged in a row. The image sensor 12 detects a two dimensional image, line by line, and line image data is sequentially sent to the buffer memory 16 under the control of the controller 14. The controller 14 also acts to distribute the line image data from the buffer memory 16 to the operation parts 20 for storing in the respective data memories 24. Image data processed in the operation parts 20 is transferred through the PCI interface 26 to a PCI bus. The operation memories 22 may be Static RAMs (SRAMs) and the data memories 24 may be Synchronous Dynamic RAMs (SDRAMs).

Each set of the operation part 20 and operation memory 22 may be a Digital Signal Processor (DSP) 18, and the operation part 20 and operation memory 22 in each set respectively correspond to arithmetic circuit and internal memory in the DSP 18. Line image data captured by the image sensor 12 is distributed to DSPs 18 to improve process efficiency by parallel processing. For example, when the number of CCD elements of the line image sensor 12 is 3000, thirty DSPs 18 may be provided such that 100 pixels of the 3000 pixels for a line image data are processed in each DSP in parallel. The clock per DSP may be 250 MHz. The buffer memory 16 may be a FIFO (First-In First-Out) memory. The capacity of the data memory 24 is, for example, 48 Megabytes.

The high order polynomial for correcting the image data detected by the image sensor 12 is Equation 1 shown in the conventional technique, which has been approximated to perform look-up table (LUT) conversion. The expansion coefficients and the basis function are the ones used when Equation 1 is orthogonally expanded. Function f(x) defined in a section (0, T) is generally expanded in a series as Equation 3 below:

Equation 3

Equation 3

$$f(x) = \sum_{m=0}^{\infty} b_m y_m(x) \qquad (3)$$

Figure 3:
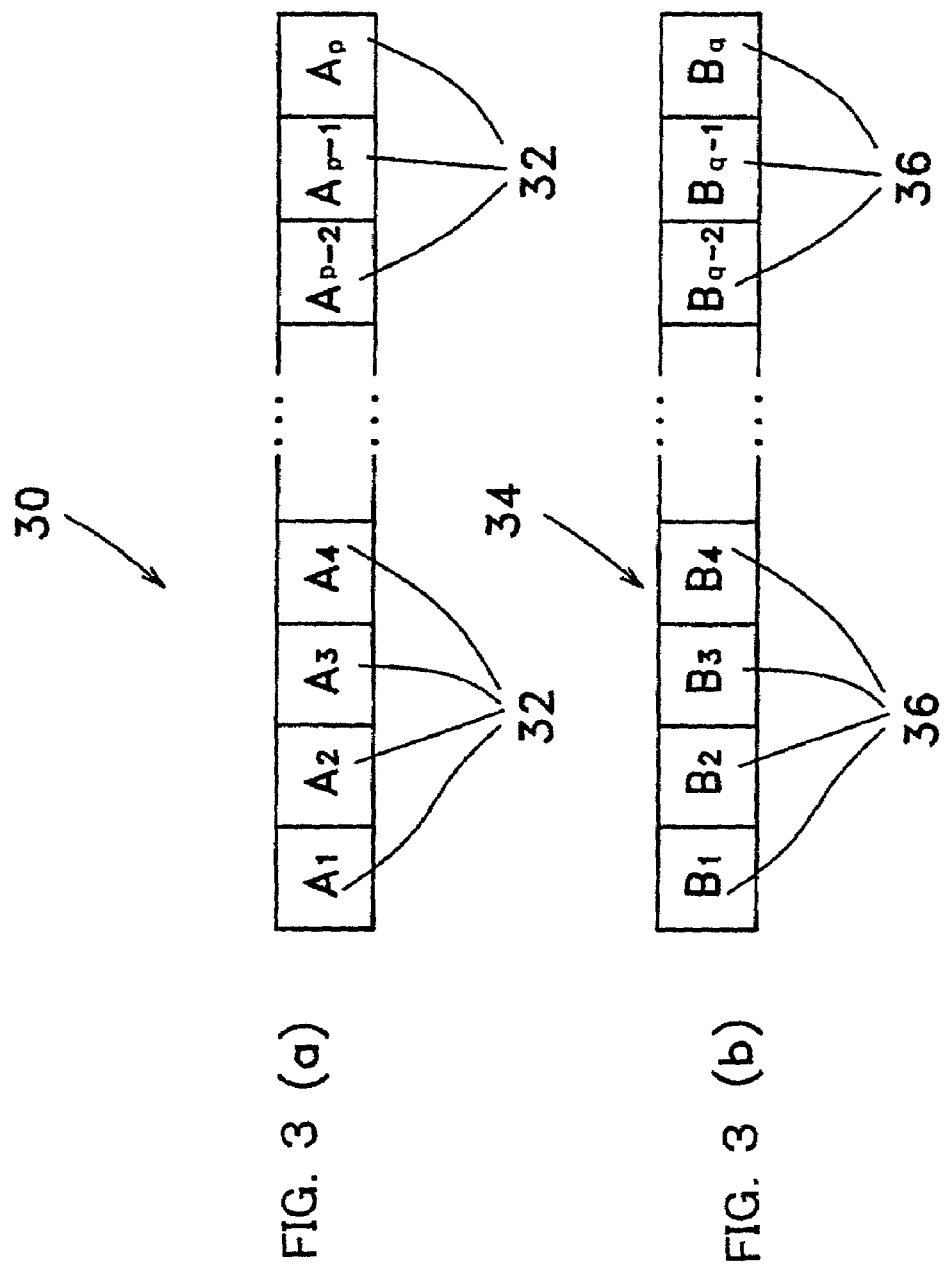
FIGS. 3(a) and 3(b) depict the storing of the coefficients for each set of COD elements in the operation memory, and the storing of the obtained operation data in the operation memory, respectively.

An output pixel value which is a result from the operation of Equation 3 is data after the correction of the input data. $\psi_m(X)$ is a basis function and $b_m$ is an expansion coefficient. When $\psi_m(X)$ is orthonormal base, $b_m$ is obtained as Equation 4 below:

Equation 4

$$b_m = \int_0^T f(x) j[\psi_m(x)] dx \quad (4)$$

j[$\psi_m$(X)] is a complex pair of $\psi_m$(X). For example, if pixel data for 100 CCD elements to be processed by each of 32 DSPs as stated above, coefficient data is obtained by the operation of Equation 4 for each CCD. As shown in FIG. 3(a), the coefficient for each set of 100 CCD elements data is stored in the operation memory 22 of a corresponding DSP 18 as the expansion coefficient array data 32 which constitutes an expansion coefficient array 30. In FIG. 3(a), $A_1$ to $A_p$ indicate numbers of array elements in the expansion coefficient array and when the number of CCD elements per DSP is 100, P=100. More particularly, the number of array elements of each expansion coefficient array corresponds to the number of CCD elements to be processed by the corresponding DSP. In the present invention, the expansion coefficient array 30 is prepared for each of expansion coefficients between 0 to quartic. Thus, five expansion coefficient arrays 30 are stored in each of the operation memories 22. Consequently, when the number of CCD elements per DSP is 100, the number of the expansion array data elements 32 stored in each of the operation memories 22 is 500. It is possible to prepare the expansion coefficient arrays 30 from 0 to $m^{th}$-order by changing the number of order to $m^{th}$-order.

When f(X) is approximated by $m^{th}$-order function as shown in the following Equation 5, it is possible to select Chebyshev function as a basis function. When m is set equal to 4, the approximation function f'(X) is obtained as shown in the following Equation 6:

Equation 5

$$f(x) \cong a_m x^m + a_{m-1} x^{m-1} + \ldots + a_1 x + a_0 \quad (5)$$

Equation 6

$$f'(x) = \sum_{m=0}^{4} b_m C[\psi_m(x)] \quad (6)$$

C[$\psi_m$] is Chebyshev function in Equation 6. Chebyshev functions C[$\psi_m$] between 0 and quartic are shown in the following Equations 7 to 11:

Equation 7

$$C[\psi_0] = k_0 \quad (7)$$

Equation 8

$$C[\psi_1] = k_1(x - x_c) \quad (8)$$

Equation 9

$$C[\psi_2] = k_2 \left( (x - x_c)^2 - \frac{n^2 - 1}{12} \right) \quad (9)$$

$$C[\psi_3] = k_3 \left( (x - x_c)^3 - \frac{3n^2 - 7}{20} (x - x_c) \right) \quad \text{Equation 10}$$

$$C[\psi_4] = k_4 \left( (x - x_c) \frac{3n^2 - 13}{14} (x - x_c)^2 + \frac{3(n^2 - 1)(n^2 - 9)}{560} \right) \quad \text{Equation 11}$$

$X_c$ in Equations 8 to 11 is a median of the domain of x and n is the number of samples when x is discretized in an interval of "1". The domain is the range of pixel values which the input image data may take. In the present invention, the pixel value represents brightness detected by the CCD sensor. When the input data is 10 bits, its domain is within the range of 0 to 1023. $K_m$(m=0, 1, 2, 3, 4) is a coefficient to normalize the data. Equation 6 is expressed as shown in Equation 12.

Equation 12

Output pixel value=

Quartic expansion coefficient array [pixel number]

X Quartic Chebyshev function array [input pixel value]

+Cubic expansion coefficient array [pixel number]

X Cubic Chebyshev function array [input pixel value]

+Quadratic expansion coefficient array [pixel number]

X Quadratic Chebyshev function array [input pixel value]

+First order expansion coefficient array [pixel number]

X First order Chebyshev function array [input pixel value]

+0-order expansion coefficient array [pixel number]

X 0-order Chebyshev function array [input pixel value] (12)

In Equation 12, multiplication is executed five times and addition is executed four times. Equation 13 is obtained by combining the terms of zero order and first order in Equation 6 to reduce the number of arithmetic operations.

$$b_1 k_1 x + (b_0 k_0 - b_1 k_1 x_c) \quad \text{Equation 13}$$

Equation 14 is obtained by transforming Equation 13.

$$b_1 k_1 (x - x_c) + b_0 k_0 \quad \text{Equation 14}$$

The terms of zero order and first order Chebyshev functions become "1" and x by defining the first order expansion coefficient as $b_1 k_1$ and the zero order expansion coefficient as $b_0 k_0 - b_1 k_1 x_c$. x is input image data, more particularly, an input pixel value. The operation of Equation 12 that the operation parts 20 execute is simplified as the following Equation 15:

Equation 15

Output pixel value=

Quartic expansion coefficient array [pixel number]

X Quartic Chebyshev function array [input pixel value]

+Cubic expansion coefficient array [pixel number]

X Cubic Chebyshev function array [input pixel value]

+Quadratic expansion coefficient array [pixel number]

X Quadratic Chebyshev function array [input pixel value]

+First order expansion coefficient array [pixel number]

X input pixel value

+0-order expansion coefficient array [pixel number]    (15)

In accordance with Equation 15, operation data is obtained by calculating quadratic to quartic Chebyshev functions in Equations 9 to 11 in the whole domain. As shown in FIG. 3(b), the obtained operation data is stored in respective operation memories 22 as the Chebyshev function (basis function arrays) array data 36. $B_1$ to $B_q$ shown in FIG. 3(b) are array element numbers of the Chebyshev function arrays 34. When the input pixel data is represented by 10 bits, q is 1024. The array element numbers of the Chebyshev function array correspond to the pixel values taken by the input data. Since the function values 36 are obtained for each Chebyshev function from quadratic to quartic, three Chebyshev function arrays 34 are prepared in each of the operation memories 22. Thus, when the input pixel data is 10 bits, 3072 (3×1024) array data 36 is stored in each of the operation memories 22. If the number of order is m, the Chebyshev function arrays 34 from quadratic to $m^{th}$ order will be prepared.

The output pixel value obtained in Equation 15 is data obtained by the correction of the input data. Multiplication is executed four times and addition is executed four times in Equation 15. The operation results obtained in zero order and first order Chebyshev functions are not stored in the operation memories 22 because they are each "1" and an input pixel value.

The pixel number indicates which CCD element has been used. In Equation 15, "$m^{th}$-order expansion coefficient array [pixel number]" (m is 0 to 4) indicates the expansion coefficient array data 32 obtained by the operation parts 20 accessing each of the 0 to quartic expansion coefficient arrays 30 employing the pixel number as an argument. That is, the operation parts 20 access each of the quadratic to quartic expansion coefficient arrays 30 stored in the operation memories 22 to obtain the expansion coefficients corresponding to the pixel number.

In Equation 15, "mth-order Chebyshev function array [input pixel value]" (m is 2 to 4) indicates the Chebyshev function array data 36 obtained by the operation parts 20 accessing each of the quadratic to quartic Chebyshev function arrays 34 stored in the operation memories 22 employing the input pixel value as an argument. That is, the operation parts 20 access each of the quadratic to quartic Chebyshev function arrays 34 stored in the operation memories 22 employing the input pixel value as an argument to obtain the Chebyshev function values corresponding to the input pixel value.

Figure 4:
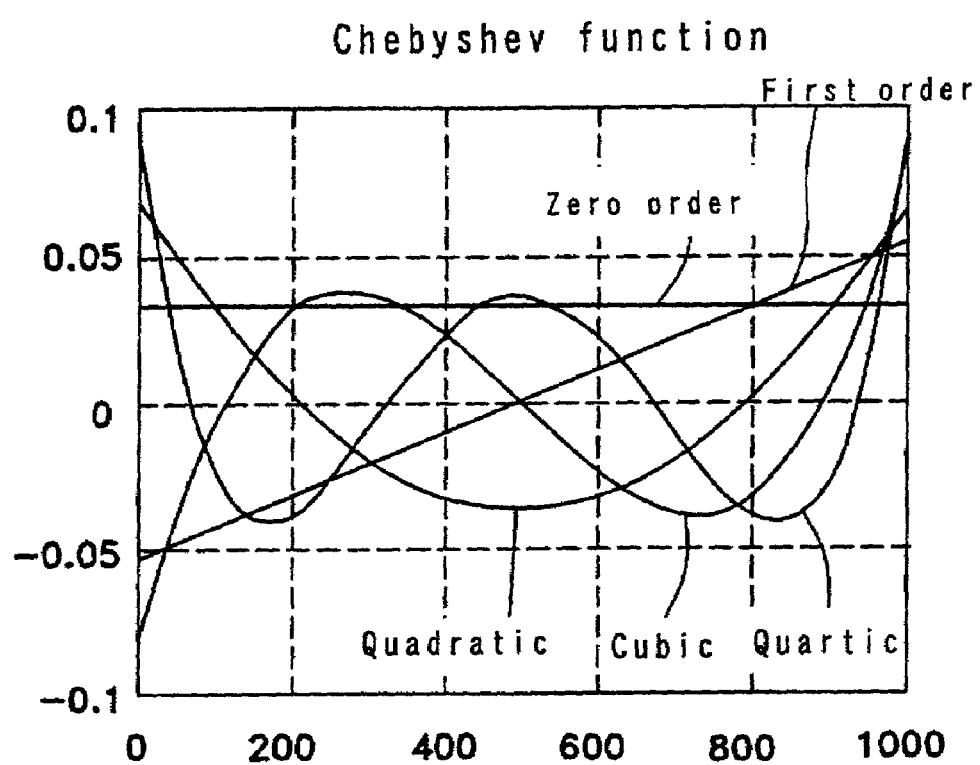
FIG. 4 is a graphical representation of a Chebyshev function.
Figure 5:
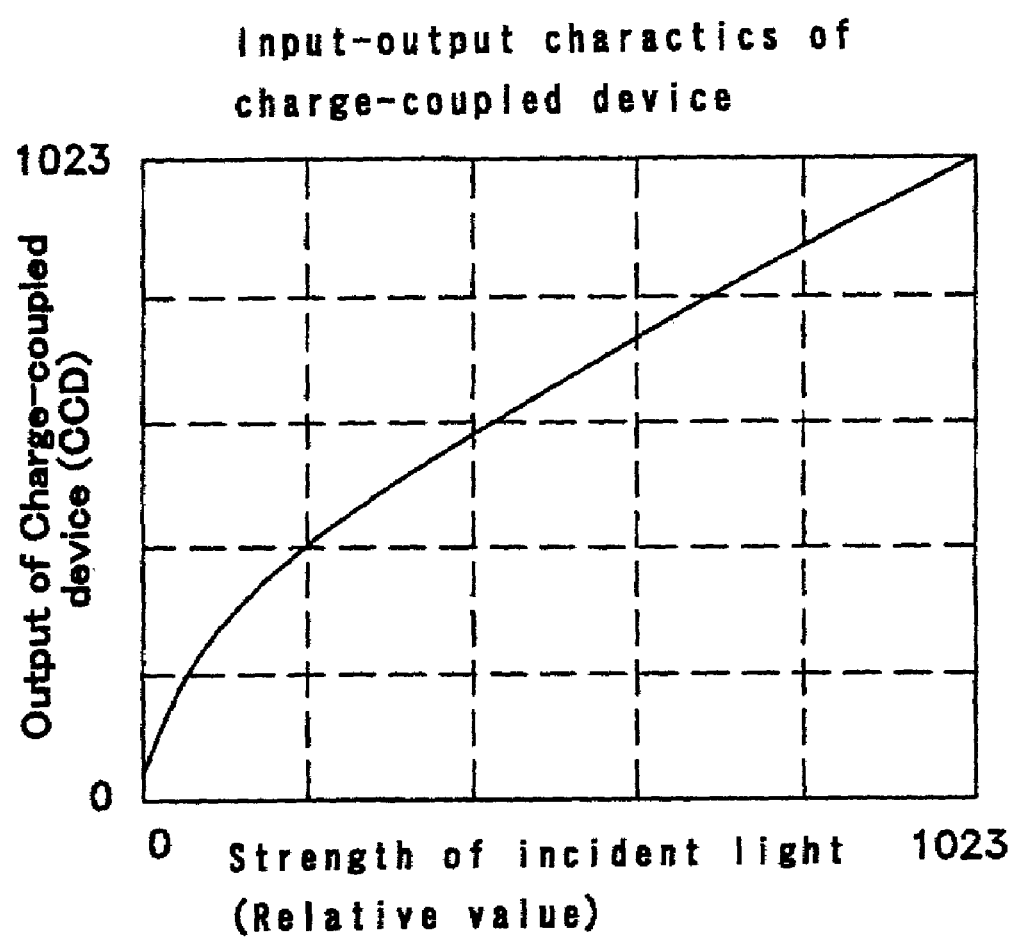
FIG. 5 is a graphical comparison of various polynomials.

As shown in FIG. 4, a Chebyshev function which is a basis function is guaranteed that it does not diverge in the domain (0 to 1023) and can be expressed in 16 bits. In Equation 15, 16-bit multiplication (16 bits×16 bits) is performed and the result of the multiplication is 32 bits in single precision arithmetic.

Figure 2:
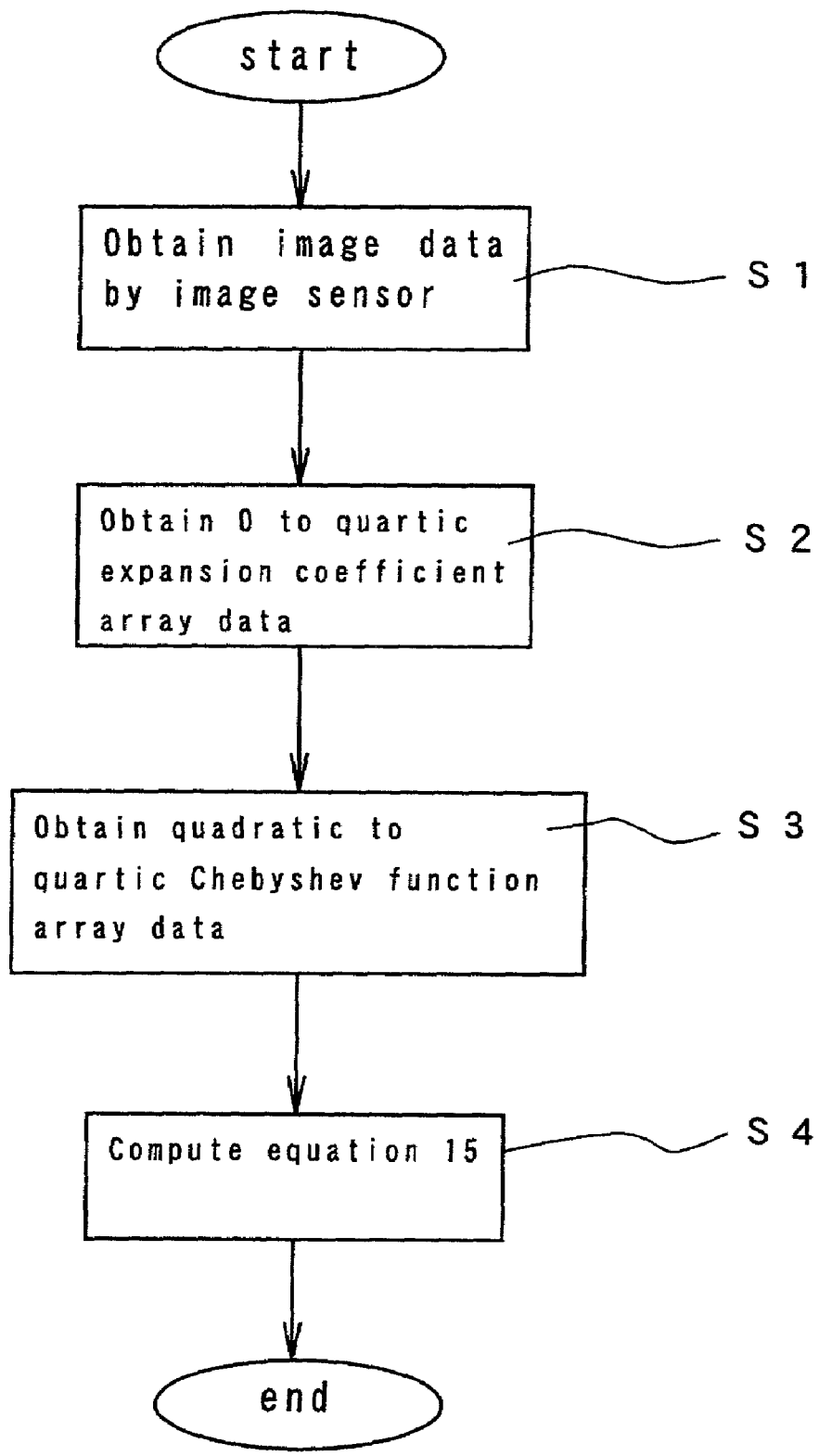
FIG. 2 is a flow chart showing a method for data correction using the data correction apparatus of the present invention.

Next, a description will be given to the method for data correction using the data correcting apparatus 10 of the present invention. Data is corrected in accordance with a flow chart shown in FIG. 2. A line image sensor 12 reads a two-dimensional image for each line and the read data is sent to the buffer memory 16 as input pixel data (Step 1). The line image data including, for example, 3000 pixels is divided into 30 sets of 100 pixel data which are distributed to 30 DSPs for storing in the respective data memories 24.

Each operation part 20 corrects the input pixel data stored in its associated data memory 24. The operation parts 20 access the 0 to quartic expansion coefficient arrays 30 in the operation memories 22 for each of the pixel data stored in the data memories 24 using the pixel number as an argument and obtains the expansion coefficient array data 32 from each of the expansion coefficient arrays 30 (Step 2). For example, when by the pixel number is $A_1$, in FIG. 3(a), the operation part 20 will access the 0 to quartic expansion coefficient arrays 30 stored in the operation memory 22 using $A_1$ as an argument.

In addition, the operation parts 20 access the quadratic to fourth Chebyshev function arrays 34 using the input image data (input pixel value) in the data memories 24 as an argument to obtain the Chebyshev function value 36 from each of the Chebyshev function arrays 34 (Step 3). In FIG. 3(b), when the input image data is $B_1$, the operation part 20 will access the Chebyshev function arrays 34 stored in the operation memory 22 using $B_1$ as an argument.

The operation parts 20 execute arithmetic operations in Equation 15 using the 0 to quartic expansion coefficient array data 32 and the quadratic to quartic Chebyshev function array data 36 read from the operation memories 22 (Step 4). Only the input pixel value is multiplied to the first order expansion coefficient array data.

An output pixel value, which is a corrected value, is outputted to PCI BUS 28 through the PCI interface 26.

Now, used memory space in the case of using the data correcting apparatus 10 of the present invention will be described. It is assumed that the number of pixels (the number of CCD elements) is $I_{max}$, the range of input pixel values (domain) is n, and the number of order of the high order polynomial is M. The total number of array elements of the expansion coefficient arrays and the Chebyshev function arrays becomes $I_{max}X(M+1)+(M-1)Xn$. Assuming that $I_{max}$ is 100, n is 1024, and M is 4, the number of array elements is 3572, so that the used memory space is 7144 bytes.

If conventional LUT conversion is used, the total number of array elements is $I_{max}Xn$. If $I_{max}$ is 100 and n is 1024, the number of array elements is 102400, so that the used memory space is 204800 bytes. When a conventional high order polynomial (Equation 2) is completely calculated, the total number of array elements is $I_{max}X(M+1)$. Assuming that $I_{max}$ is 100 and M is 4, the number of array elements is 500, so that the used memory space is 1000 bytes.

Now, operation load in the case of using the data correcting apparatus 10 of the present invention will be described. In Equation 15, multiplication is executed four times and addition is executed four times. The expansion coefficient array data 32 and the Chebyshev function array (basis function array) data 36 stored in the operation memories 22 are normalized. The multiplication is, therefore, single precision multiplication (16 bits×16 bits) and the number of single precision multiplication to be executed is four times. When the pixel rate is 30 MHz, the operation load is 120 operations per second.

In the case of conventional LUT conversion, the number of operations is 0 due to no arithmetic operation performed. When a high order polynomial (Equation 2) is wholly executed, multiplication is executed four times. The multiplication in this case is long precision multiplication (32 bits×32 bits). When the long precision multiplication is converted into single precision multiplication, sixteen-time single precision multiplications are required. When the pixel rate is 30 MHz, 480 operations need to be performed per second.

Table 1 shows the above-mentioned used memory space and operation load.

TABLE 1

| | Used Memory Space (bytes) | # operations performed |
|---|---|---|
| Apparatus (10) | 7144 | 4 |
| Conv. LUT | 204800 | 0 |
| Eqn. 2 | 1000 | 16 |

As indicated in Table 1, the used space of the operation memories 22 is far smaller than the case of using the LUT conversion. Unlike the case of using the high order polynomial approximating the LUT conversion, the operation parts 20 may have a relatively low throughput. Normalization of the basis function enables arithmetic operation to be executed in single precision arithmetic, so that the processing speed becomes faster. The use of the Chebyshev function as a basis function cuts down on the used memory space of the operation memories 22 because zero and first order Chebyshev function array data is not stored in the operation memories 22. Since the zero order Chebyshev function is 1, zero order multiplication is omitted.

As has been described above, the embodiments of the apparatus and method for data correction have been described so far, but the present invention is not limited to these embodiments. For example, a function other than the Chebyshev function may be used as a basis function as long as it is orthonormal. Also, a planar sensor may be used instead of a line image sensor.

There have thus been shown and described novel method and apparatus for image data correction, which fulfill all the objects and advantages sought therefor. Many changes, modifications, variations, combinations, and other uses and applications of the subject invention will, however, become apparent to those skilled in the art after considering this specification and the accompanying drawings which disclose the preferred embodiments thereof. All such changes, modifications, variations and other uses and applications which do not depart from the spirit and the scope of the invention are deemed to be covered by the invention, which is to be limited only by the claims which follow.

What is claimed is:

1. An apparatus for correcting image data detected by an image sensor composed of a plurality of sensing elements, comprising:
    an operation memory for storing expansion coefficient array data and basis function array data, said expansion coefficient array data and said basis function array data respectively including data of expansion coefficients and function values of a basis function for orthogonal expansion of a high order polynomial for correcting the image data; and
    an operation part for correcting the image data using the expansion coefficient array data and the basis function array data.

2. The apparatus according to claim 1, comprising more than one operation memory and operation part.

3. The apparatus according to claim 1, wherein said expansion coefficient array data includes the expansion coefficients for each of the sensing elements.

4. The apparatus according to claim 2, wherein said expansion coefficient array data includes the expansion coefficients for each of the sensing elements.

5. The apparatus according to claim 1, wherein said basis function array data includes the basis function values for each of pixel values which the image data may take.

6. The apparatus according to claim 4, wherein said basis function array data includes the basis function values for each of pixel values which the image data may take.

7. The apparatus according to claim 1, wherein said basis function is a Chebyshev function.

8. The apparatus according to claim 6, wherein said basis function is a Chebyshev function.

9. The apparatus according to claim 7, wherein said Chebyshev function is a quadratic to quartic Chebyshev function.

10. The apparatus according to claim 1 wherein said high order polynomial is an equation obtained by approximation of a look-up table (LUT) conversion.

11. The apparatus according to claim 9 wherein said high order polynomial is an equation obtained by approximation of a look-up table (LUT) conversion.

12. The apparatus according to claim 1, wherein said operation part is an arithmetic circuit of a digital signal processor (DSP) and said operation memory is an mt ernal memory of said DSP.

13. The apparatus according to claim 11, wherein said operation part is an arithmetic circuit of a digital signal processor (DSP) and said operation memory is an internal memory of said DSP.

14. A method for correcting image data detected by an image sensor composed of a plurality of sensing elements, comprising the steps of:
    storing expansion coefficient array data and basis function array data in an operation memory, said expansion coefficient array data and basis function array data respectively including data of expansion coefficients and function values of a basis function for orthogonal expansion of a high order polynomial for correcting the image data;
    reading said expansion coefficients and basis function values from said operation memory; and
    performing arithmetic operations on said image data with said read expansion coefficients and basis function values to correct the image data.

15. The method according to claim 14, wherein said expansion coefficient array data includes the expansion coefficients for each of the sensing elements, and in said reading step, the expansion coefficients corresponding to a sensing element detecting image data to be corrected are read for correction of the image data.

16. The method according to claim 15 wherein said basis function array data includes the basis function values for each of pixel values which the image data may take, and n said reading step, the basis function values corresponding to a pixel value of image data to be corrected are read for correction of the image data.

17. The method according to claim 14 wherein said basis function is a Chebyshev function.

18. The method according to claim 16 wherein said basis function is a Chebyshev function.

* * * * *